US007697757B2

United States Patent
Yacoub et al.

(10) Patent No.: US 7,697,757 B2
(45) Date of Patent: Apr. 13, 2010

(54) COMPUTER ASSISTED DOCUMENT MODIFICATION

(75) Inventors: Sherif Yacoub, Barcelona (ES); Giuliano Di Vitantonio, Bristol (GB); Suzanne Prince, Aiken, SC (US); Vinay Saxena, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1157 days.

(21) Appl. No.: 11/153,820

(22) Filed: Jun. 15, 2005

(65) Prior Publication Data

US 2006/0288279 A1  Dec. 21, 2006

(51) Int. Cl.
   *G06F 17/00* (2006.01)
(52) U.S. Cl. .................... 382/176; 715/530
(58) Field of Classification Search .............. 382/176; 715/530
   See application file for complete search history.

(56) References Cited

U.S. PATENT DOCUMENTS

| | | | | |
|---|---|---|---|---|
| 4,910,785 A * | 3/1990 | Nakatsuma | ............ | 382/176 |
| 5,444,840 A * | 8/1995 | Froessl | ............ | 707/2 |
| 5,689,342 A * | 11/1997 | Nakatsuka | ............ | 358/296 |
| 5,907,631 A * | 5/1999 | Saitoh | ............ | 382/176 |
| 6,134,565 A * | 10/2000 | Hommersom et al. | ....... | 715/210 |
| 2004/0208371 A1* | 10/2004 | Liu et al. | ............ | 382/173 |
| 2005/0025338 A1* | 2/2005 | Zhao et al. | ............ | 382/100 |

FOREIGN PATENT DOCUMENTS

EP  606593 A2 *  7/1994

OTHER PUBLICATIONS

Sherif Yacoub, U.S. Appl. No. 10/964,094, filed Oct. 13, 2004 entitled "Article Extraction".

* cited by examiner

*Primary Examiner*—Samir A. Ahmed
*Assistant Examiner*—John W Lee

(57) ABSTRACT

A method, apparatus, and system are disclosed for computer assisted document modification. One embodiment is a method for software execution. The method automatically extracts articles, in a first phase, from documents to generate different zones of the articles. Different zones of the extracted articles are displayed. In a second phase, plural different zones are manually modified with a document correction tool.

26 Claims, 7 Drawing Sheets

COMPUTER ASSISTED DOCUMENT MODIFICATION

BACKGROUND

Publishers, government offices, and other institutions often desire to convert large collections of paper-based documents into digital forms that are suitable for digital libraries and other electronic archival purposes. In some instances, the number of documents to be converted is quite large and exceeds thousands or even hundreds of thousands of individual pages.

Computers are used to convert such large collections of paper-based documents into computer-readable formats. For example, paper-based documents are initially scanned to produce digital high-resolution images for each page. The images are further processed to enhance quality, remove unwanted artifacts, and analyze the digital images.

The digital images, however, often include errors and thus are not acceptable for digital libraries and other electronic archival purposes. Even fully automated document analysis and extraction systems are not able to generate documents that are errorless, especially when large collections of paper-based documents are being converted into digital form. By way of example, some documents contain a mixture of text and images, such as newspapers and magazines that include advertisements or pictures. Automated document analysis and extraction systems can generate errors while analyzing and extracting different portions of the documents.

DETAILED DESCRIPTION

Figure 1:
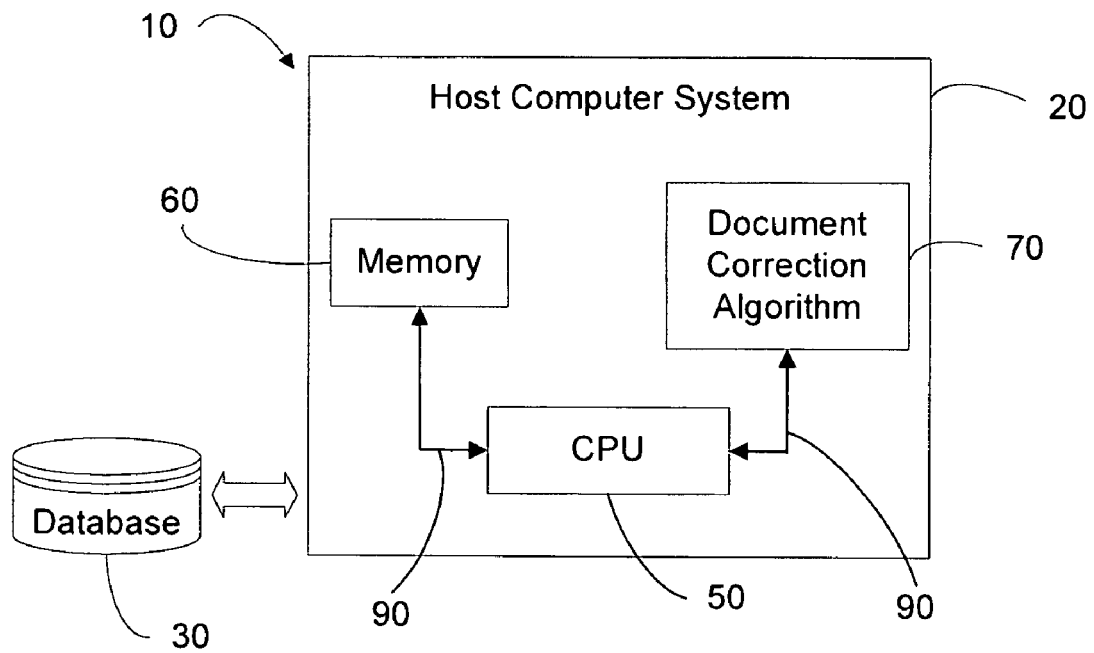
FIG. 1 illustrates an exemplary system in accordance with an embodiment of the present invention.

Exemplary embodiments in accordance with the present invention are directed to systems, methods, and apparatus for computer assisted and manual correction of documents and articles extracted from documents. These embodiments are utilized with various systems and apparatus. FIG. 1 illustrates an exemplary embodiment as a system 10 for correcting documents and articles extracted from documents.

The system 10 includes a host computer system 20 and a repository, warehouse, or database 30. The host computer system 20 comprises a processing unit 50 (such as one or more processors of central processing units, CPUs) for controlling the overall operation of memory 60 (such as random access memory (RAM) for temporary data storage and read only memory (ROM) for permanent data storage) and a document correction algorithm 70. The memory 60, for example, stores data, control programs, and other data associate with the host computer system 20. In some embodiments, the memory 60 stores the document correction algorithm 70. The processing unit 50 communicates with memory 60, data base 30, document correction algorithm 70, and many other components via buses 90.

Embodiments in accordance with the present invention are not limited to any particular type or number of data bases and/or host computer systems. The host computer system, for example, includes various portable and non-portable computers and/or electronic devices. Exemplary host computer systems include, but are not limited to, computers (portable and non-portable), servers, main frame computers, distributed computing devices, laptops, and other electronic devices and systems whether such devices and systems are portable or non-portable.

Reference is now made to FIGS. 2-5 wherein exemplary embodiments in accordance with the present invention are discussed in more detail. In order to facilitate a more detailed discussion of exemplary embodiments, certain terms and nomenclature are explained.

As used herein, the term "document" means a writing or image that conveys information, such as a physical material substance (example, paper) that includes writing using markings or symbols. The term "article" means a distinct image or distinct section of a writing or stipulation, portion, or contents in a document. A document can contain a single article or multiple articles. Documents and articles can be based in any medium of expression and include, but are not limited to, magazines, newspapers, books, published and non-published writings, pictures, text, etc. Documents and articles can be a single page or span many pages.

As used herein, the term "file" has broad application and includes electronic articles and documents (example, files produced or edited from a software application), collection of related data, and/or sequence of related information (such as a sequence of electronic bits) stored in a computer. In one exemplary embodiment, files are created with software applications and include a particular file format (i.e., way information is encoded for storage) and a file name. Embodiments in accordance with the present invention include numerous different types of files such as, but not limited to, image and text files (a file that holds text or graphics, such as ASCII files: American Standard Code for Information Interchange; HTML files: Hyper Text Markup Language; PDF files: Portable Document Format; and Postscript files; TIFF: Tagged Image File Format; JPEG/JPG: Joint Photographic Experts Group; GIF: Graphics Interchange Format; etc.), etc.

Figure 2:
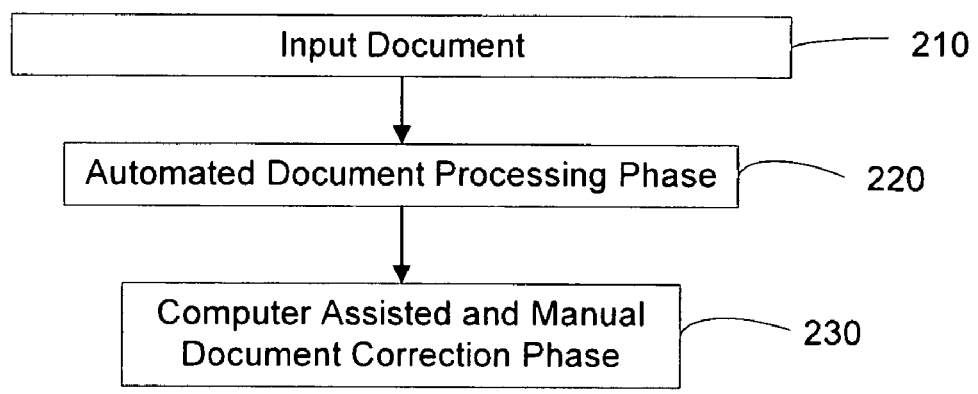
FIG. 2 illustrates an exemplary flow diagram in accordance with an embodiment of the present invention.

FIG. 2 illustrates an exemplary flow diagram for achieving high accuracy in reconstructing articles from documents. The flow diagram utilizes two separate phases: a fully automated document processing phase, and a computer assisted manual document correction phase. In some exemplary embodiments, output from the automated document processing phase is input to the computer assisted manual document correction phase to enable viewing and correcting of documents and articles. The viewing and correcting, performed by a user, enable large volumes of documents (example, thousands or millions of pages) to be processed and corrected so documents are accurately converted to digital images with little or no errors. Further, the time and effort to correct errors or make other modifications resulting from the automated document processing phase are significantly reduced since viewing and correcting occur in the computer assisted manual document correction phase.

According to block 210, a document or documents are input. By way of example, the documents include a large collection of paper-based documents that are being converted into digital forms suitable for electronic archival purposes, such as digital libraries or other forms of digital storage. In one exemplary embodiment in accordance with the invention, paper-based documents are scanned and converted into raster electronic versions (example, digital high-resolution images). Raster images for each page of a document (example, TIFF, JPEG, etc.) are further processed with image analysis techniques to enhance image quality and remove unwanted artifacts.

According to block 220, the automated document processing phase occurs on the documents that are input. In this phase, one or more automated processes occur, such as automatic recognition processes to extract the structure and content of the document and/or articles. These processes include, but are not limited to, identification of zones in the document, text recognition (such as OCR: optical character recognition), identification of text reading order in the document, structure analysis, logical and semantic analysis, extraction of articles and advertisements from the documents, etc. By way of further example for this phase, articles in a scanned document are automatically identified with minimal or no user intervention; paper documents are converted into electronic articles or files; multiple scoring schemes are utilized to identify a reading order in an article; and text regions (including title text regions) are stitched to correlate each region of the article.

Embodiments in accordance with the present invention are compatible with a variety of automated document processing systems, engines, and phases. By way of example, this processing phase is described in United States Patent Application entitled "Article Extraction" and having application Ser. No. 10/964,094 filed Oct. 13, 2004; this patent application being incorporated herein by reference.

Output from the automated document processing phase 220 can include errors. In order to reduce or eliminate the errors, the computer assisted manual document correction phase occurs according to block 230. The computer assisted manual document correction phase enables to user to make modifications to the output from the automated document processing phase 220. Such modifications are not limited to errors. By way of example only, a user can modify zones, linkings, flow-order, etc. As further examples, a user can modify an order or layout of an article or document (such as adding, moving, or subtraction text and/or images) and re-arrange text or images.

In one exemplary embodiment, human beings (i.e., users) perform the computer assisted manual document correction phase to reduce or eliminate errors from the automated document processing phase. By way of example, a customer can require or specify a particular level of error or accuracy for the extraction of articles from original paper-based documents and their reconstruction as standalone entities. In order to achieve this level or accuracy, both phases 220 and 230 are utilized. In one exemplary embodiment, the automated phase 220 provides automatic digitization and reconstruction of documents with the highest possible automated accuracy, and the computer assisted manual phase provides the human operator with the computer-based tool to manually make additional corrections where necessary.

Figure 3:
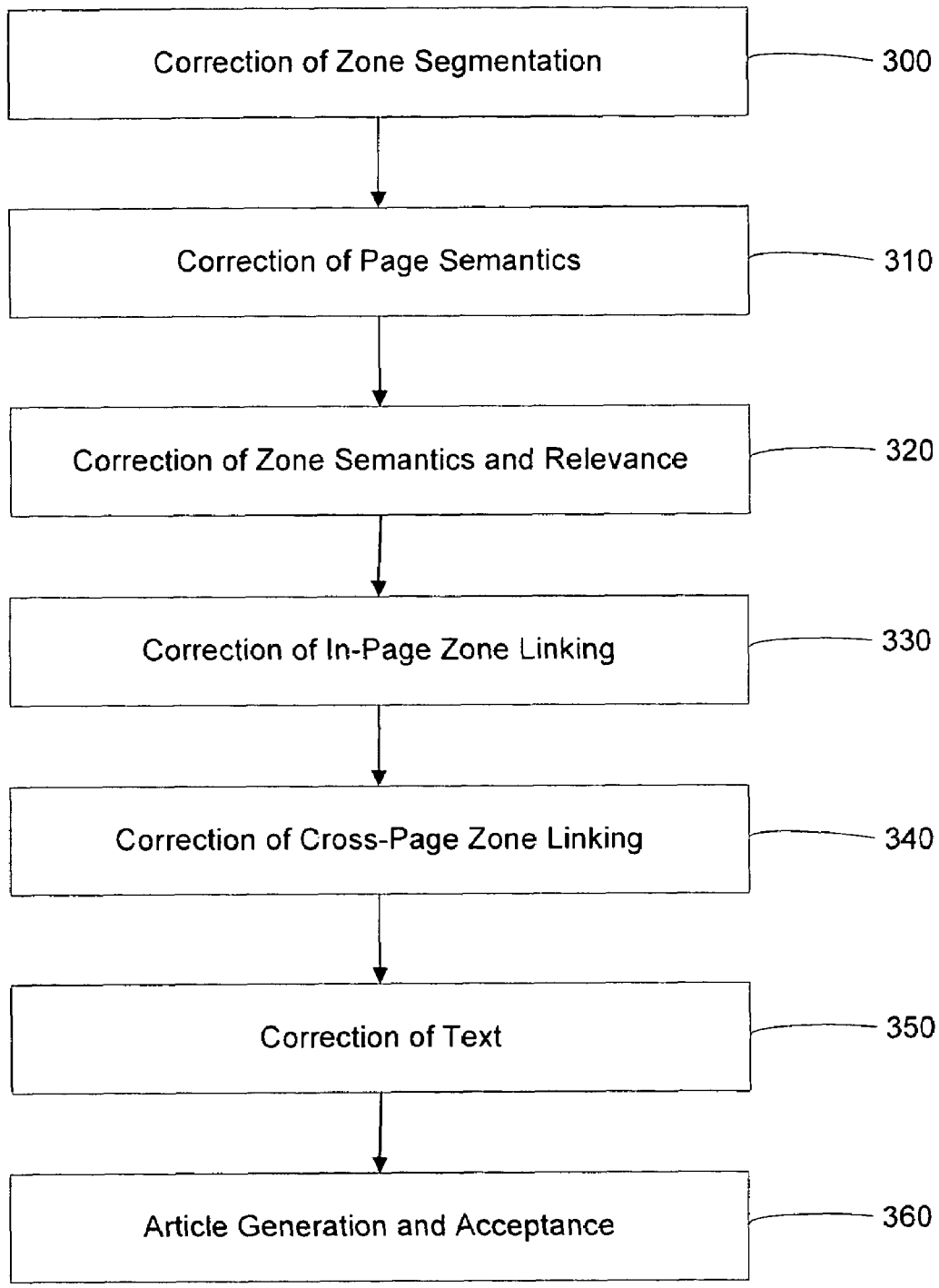
FIG. 3 illustrates an exemplary flow diagram of the computer assisted and manual document correction phase in accordance with an embodiment of the present invention.

FIG. 3 illustrates an exemplary flow diagram of the computer assisted and manual document correction phase 230 of FIG. 2 in accordance with an embodiment of the present invention. The diagram illustrates plural phases (shown as blocks) that are manually implemented by a user during the computer assisted and manual document correction phase.

Block 300 represents the correction of zone segmentation. In this phase, a user corrects or fixes zoning errors, such as errors occurring in zone segmentation. By way of example, two or more zones can have overlapping text that was not present in the original document. As another example, one or more zones can have text that was cut-off or improperly excluded from the original document.

A user can manually correct the zone segmentation. For example, a user can select and identify zones, blocks, portions of a page, or an entire page and change zone segmentation. In one exemplary embodiment, corrections to zone segmentation occur near or at a beginning of the computer assisted and manual document correction phase since other phases can depend on having accurate zone segmentation as an input.

Figure 4A:
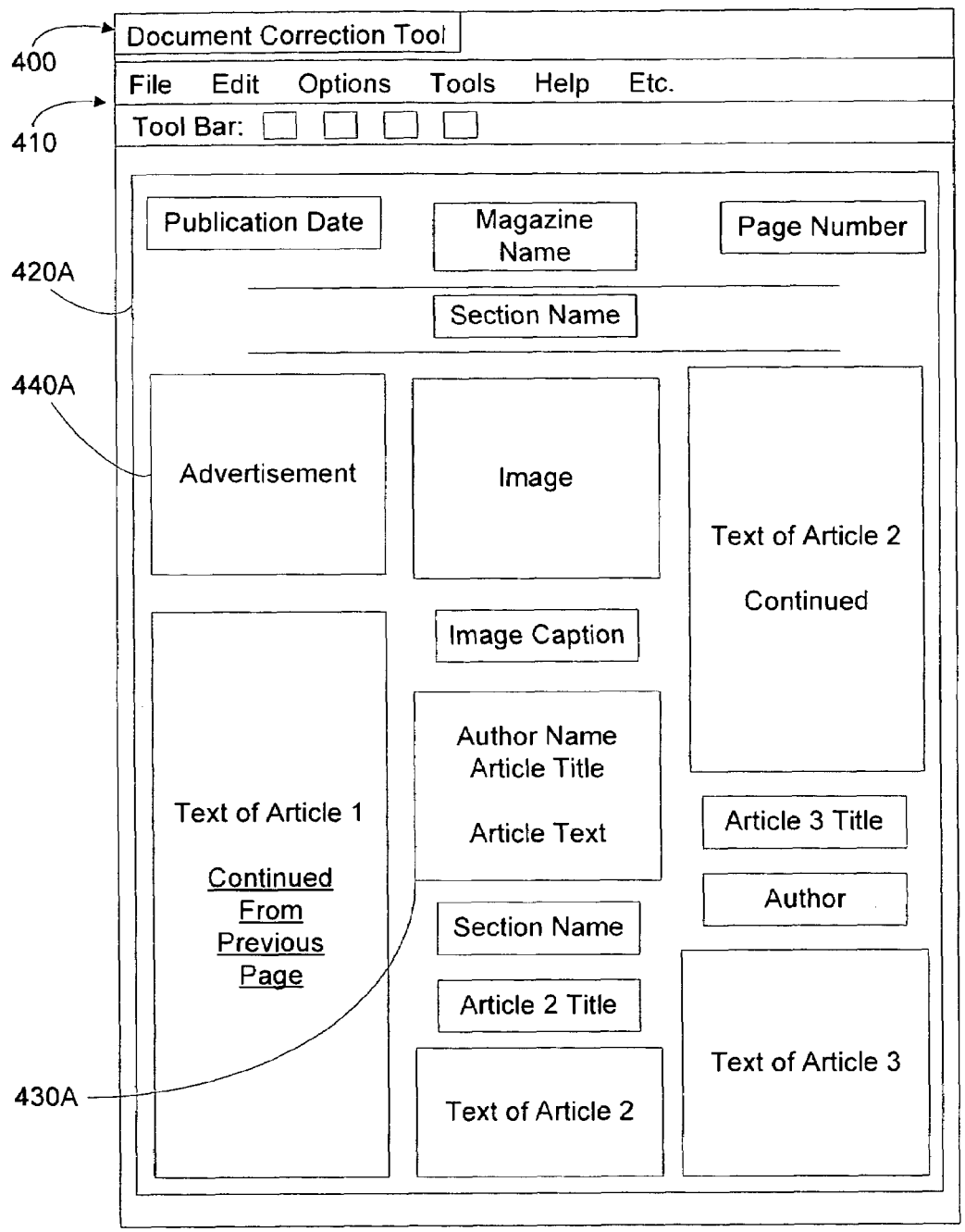
FIG. 4A illustrates an exemplary document correction tool for performing the computer assisted and manual document correction phase in accordance with an embodiment of the present invention.

FIG. 4A illustrates an exemplary screenshot of a computer assisted and manual document correction tool 400. The layout and features of the tool 400 are provided as an exemplary illustration. Thus, by way of example, the tool 400 includes a top menu bar 410 with plural dropdown menus (shown as File, Edit, Options, Tools, Help, etc.) and a toolbar. A central portion of the screen includes a page or an image of a document 420A (example, one page of a magazine) that was input into the computer assisted and manual correction phase (see 230 of FIG. 2). The magazine is segmented into a plurality of different zones (shown as blocks or boxes). By way of example, some of the different zones include publication date, name of the magazine, section name, text of different articles, an image, an image caption, names of authors for different articles, titles of articles, etc.

As shown in FIG. 4A, one block 430A includes three different segments (author name, article title, and article text) that are incorrectly segmented into a single segment or block. During the zone segmentation phase, a user can visually identify this exemplary segmentation error and alter the segments so block 430A includes three different and separate zone segments, one segment for each of author name, article title, and article text.

Block 310 represents the correction of page semantics. In this phase, a user verifies and corrects semantics of an entire page, such as document 420A. In one exemplary embodiment, page semantics include the meaning of the page in the overall document. By way of example, page semantics include, but are not limited to, the following: table of content (TOC), advertisement, article, manifest, and section.

The following discussion provides an illustration of correcting page semantics. In FIG. 4A, the document 420A (example, an entire page) can be improperly labeled as an advertisement by the automated document processing phase (see phase 220 of FIG. 2). Upon visual inspection, a user can quickly identify that document 420A is incorrectly labeled as an advertisement and change the page semantics to article.

Thus, the automated document processing phase can mistakenly recognize and designate a page as one semantic instead of another semantic (example, mistakenly label an advertisement as an article, mistakenly label an article as a TOC, etc.). In phase 310, corrections are made to appropriate pages in the document to ensure that the document semantics are accurately identified, labeled, and associated with the correct document and/or article.

Block 320 represents the correction of zone semantics and relevance. In this phase, a user verifies and corrects semantics for zones of a page. In one exemplary embodiment, one objective of zone semantic correction is to ensure that each zone in the article is correctly tagged or labeled with a designation, such as title, body of text, advertisement, etc. Various different designations exist and depend on, for example, the documents being processed and corrected. Examples of designations for zone semantics include, but are not limited to, author, body, header, footer, footnote, page number, section, subsection, title, subtitle, caption, margin, date, volume, etc.

In one exemplary embodiment, each designation for a zone semantic (author, body, etc.) is represented with a different or unique visual indicia (such as color). In FIG. 4A, each different zone semantic (example, each box or contents in each box) are a unique color. Different zone semantics with the same designation (example, two different authors) have the same color. When an error is detected by a user, the color of the zone is changed to match the correct color assigned to the particular designation. As an example, a user uses a drop down menu at the tool bar or menu bar 410 to change the color of a zone and semantics for that zone.

Further, each zone in a page has a relevance to that page. Examples of possible zone relevance include, but are not limited to: article, advertisement, insert, TOC, letters2editor, manifest, etc. Each zone is labeled with zone relevance. In this phase, a user can check and correct zones in the page to verify that zones are labeled with the correct relevance. By way of example, suppose the automated document processing phase labels zone 440A in FIG. 4A as an article. During correction of zone relevance, a user can visually identify that zone 440A is actually an advertisement and re-label zone 440A as an advertisement.

Block 330 represents the correction of in-page zone linking. In this phase, a user verifies and corrects reading order or flow of text and/or images in articles and documents. Further, in this phase, a user can correct zone linking errors or problems within individual pages in order to ensure that sections or blocks within a page are properly linked and that articles are accurately reconstructed. The correct linking of zones within a page to reconstruct the article requires an understanding of the flow of the article, and errors in flow between different blocks or zones can cause improper article reconstruction.

Text and images in articles and documents can be presented in various ways to readers. For instance, text in articles can be presented and read from left to write across an entire page. Alternatively, text in articles can be presented in multiple columns in a page. Regardless of the presentation or layout of articles, related zones within a page are preferably linked to each other. For example, multiple linked zones form an article.

Figure 4B:
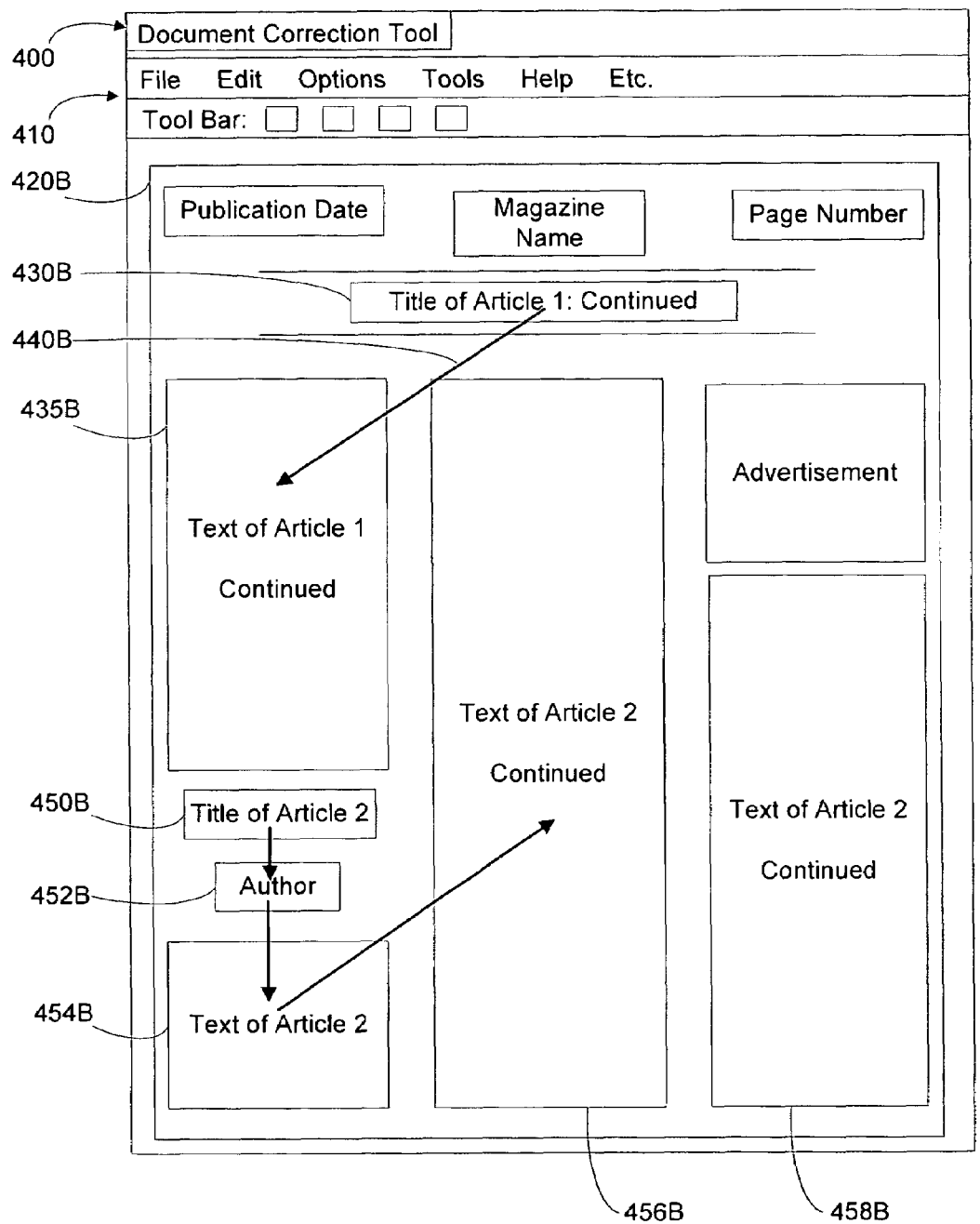
FIG. 4B illustrates another view of an exemplary document correction tool for performing the computer assisted and manual document correction phase in accordance with an embodiment of the present invention.

FIG. 4B shows an image of a document 420B (example, one page of a magazine) that was input into the computer assisted and manual correction phase (see 230 of FIG. 2). As shown, each zone is designated within a separate block. Different zones, however, within the same page relate to each other. For example, zone 430B (the Title of Article 1) relates to zone 435B (the Text of Article 1). An arrow 440B extends from zone 430B to zone 435B to visually identify the relationship between these two zones.

During the in-page zone linking phase, a user can visually determine if errors exist between zones. For example, the zones identified with article 2 are linked with a plurality of arrows. Specifically, zone 450B (Title of Article 2) links with an arrow to zone 452B (Author), which links to zone 454B (Text of Article 2), which links to zone 456B (Text of Article 2 Continued). A link or arrow, however, is missing between zone 456B and zone 458B (Text of Article 2 Continued) even though zone 458B forms part of Article 2. Upon visually noticing this missing link, a user can insert an arrow or other linking indicia to link zones 456B and 458B.

The correction of in-page zone linking is not limited to addition of arrows to indicate the reading order but also the deletion of incorrect arrows indicating relationship between zones that are not related. For example, assume that the page contains two different articles and the automated recognition system in 220 linked the two articles thinking that they are one article. The user can delete the link between the two articles to separate them.

Block 340 represents the correction of cross-page zone linking. In this phase, a user verifies and corrects reading order or flow of text and/or images in articles and documents. Further, in this phase, a user can correct zone linking errors or problems within between different and separate pages in order to ensure that sections or zone between pages are properly linked and that articles are accurately reconstructed.

In some documents, articles (including text, images, etc.) can extend or continue from one page to another. For instance, text in an article can continue over several pages even though advertisements and other images are interspersed within or between the article. Different sections or zones of the same article are preferably linked together so the entire contents of the article are reconstructed.

Figure 4C:
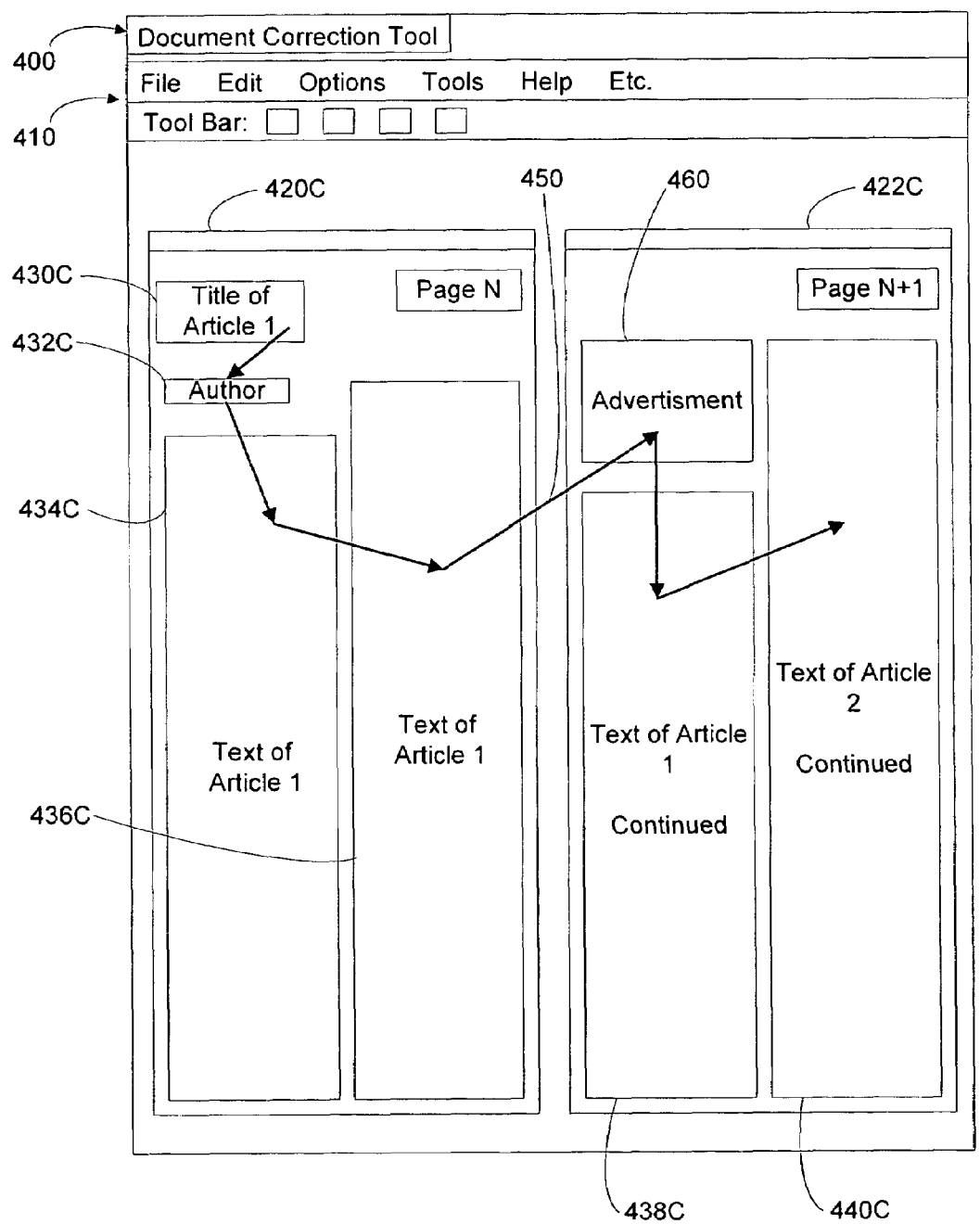
FIG. 4C illustrates another view of an exemplary document correction tool for performing the computer assisted and manual document correction phase in accordance with an embodiment of the present invention.

FIG. 4C simultaneously shows images of two side-by-side documents 420C and 422C (example, two consecutive pages from an article) that were input into the computer assisted and manual correction phase (see 230 of FIG. 2). As shown, each zone is designated within a separate block. Different zones, however, between different pages relate to each other. For example, Article 1 (shown on page N) can continue to subsequent pages (shown on page N+1). Arrows or other indicia (example, color) are used to visually illustrate flow of related zones from one page to another page.

During the cross-page zone linking phase, a user can visually determine if errors exist between zones of different pages. For example, the zones identified with Article 1 are linked with a plurality of arrows between two different pages. In the correct order, the zones are linked as follows: zone 430C (Title of Article 1) links to zone 432C (Author), which links to zone 434C (Text of Article 1), which links to zone 436C (Text of Article 1), which links to zone 438C (Text of Article 1 Continued), which links to zone 440C (Text of Article 1 Continued). A link or arrow 450, however, is incorrectly placed between zones 436C and advertisement 460 since the advertisement does not form part of Article 1. Upon visually noticing this improper link, a user can remove arrow 450 or other linking indicia to link zones 436C and 438C.

Block 350 represents the correction of text. The text correction phase occurs, for example, once the phases needed for article structure correction are completed. In this phase, a user verifies and corrects errors in letters, numbers, words, sentences, etc. This phase consists of comparing the characters or words flagged as suspect to the original text, which the tool shows right above the text under examination. During text correction and verification, a user identifies suspect or erroneous text and corrects the text.

In one exemplary embodiment, the correction of text phase includes an optical character recognition (OCR) engine. OCR generally involves reading text from paper-based documents and translating the images into file form (example, ASCII codes or Unicode) so a computer can edit the file with software (example, word processor). By way of example, the OCR engine identifies suspect text with errors by using a confidence level during automated text recognition. Words are marked as suspect due to graphical recognition of the word itself as well as the context in which it is used (grammar, dictionary, etc.) When the confidence in a decision made by the OCR engine is below a certain threshold, the candidate words are flagged as a suspect. Additional suspects are isolated through the utilization of spell checkers and semantic analyzers during or after the processing phase.

Block 360 represents the article generation and acceptance. In this phase, a user verifies completion of the manual correction phase and extracts and generates the articles. Thus, in one exemplary embodiment, an end phase in the process is the generation of the articles from the document (from the page and document presentation). Then, the articles are checked by a user for correctness. Proof reading is one exemplary technique to ensure the article correctness. In addition, the metadata about the article is also checked (title, author, section, subtitles, etc.). The proof reading process is a manually intensive process. Therefore, for some applications, this phase may not be necessary. The required level of accuracy and confidence in the results produced by the system is determined whether this step is performed or not.

The various phases illustrated in FIG. 3 can be implemented in a variety of different tools and processes to verify and check documents. FIGS. 5A-5D illustrate some exemplary processes in accordance with embodiments of the invention.

Figure 5A:
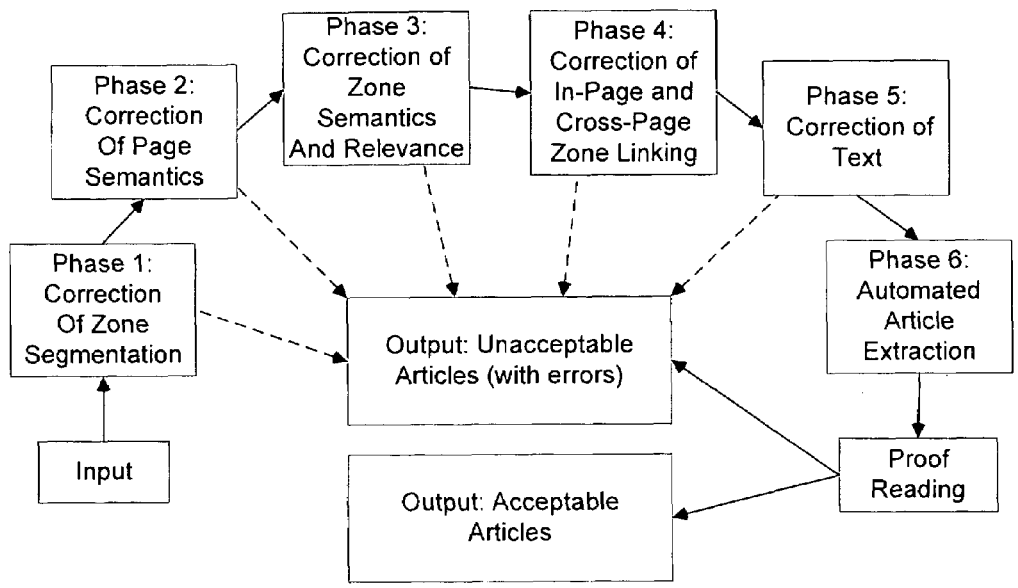
FIG. 5A illustrates an exemplary workflow process of the computer assisted and manual document correction phase in accordance with an embodiment of the present invention.

FIG. 5A illustrates an open loop process. Input is presented into phase I (Correction of Zone Segmentation). This input is page representation, document representation, page images, etc. and is produced, for example, from the automated document processing phase 220 of FIG. 2. Output from phase 1 links to phase 2 (Correction of Page Semantics), which outputs and links to phase 3 (Correction of Zone Semantics and Relevance), which outputs and links to phase 4 (Correction of In-Page and Cross-Page Zone Linking), which outputs and links to phase 5 (Correction of Text), which outputs and links to phase 6 (Automated Article Extraction), which outputs and links to Proof Reading, which outputs and links to two different outputs (Output: Unacceptable Articles; and Output: Acceptable Articles).

In FIG. 5A, the sequence of phases illustrates the impact or dependence of one phase on one or more other phases. For example, correction of zone semantics occurs after correction of zone segmentation since one or more zones may need to be manipulated and their coordinates and content changed. In other words, accurate correction of zone semantics depends on prior correction of zone segmentation.

Each phase 1-5 has a dotted or dashed line extending to Output: Unacceptable Articles. The dashed line represents a "pass" exception. During a correction phase, if a document still has errors that should have been cured or fixed in a previous phase, then the document is marked as an exception and passed into an unacceptable bucket (i.e., Output: Unacceptable). The unacceptable bucket is excluded from the output with acceptable articles (i.e., Output: Acceptable Articles).

A definition or determination for acceptable or unacceptable articles can vary and depends on the level or amount of desired accuracy. By way of example, acceptable and unacceptable are based on a percentage of accuracy or a threshold of accuracy. Articles or documents not meeting the required accuracy are passed to the unacceptable bucket, and articles and documents meeting or exceeding the required accuracy are passed to the acceptable bucket.

Figure 5B:
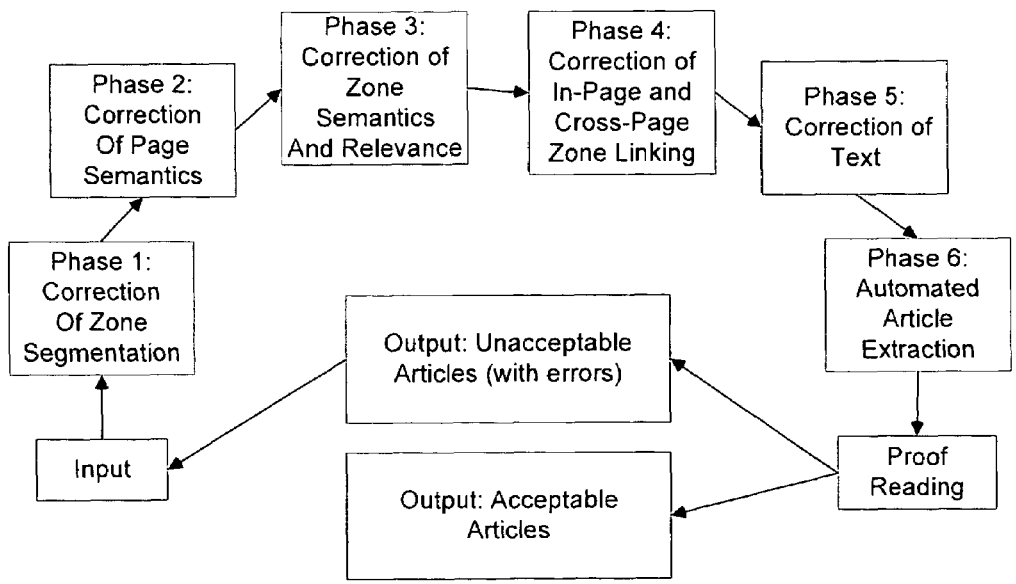
FIG. 5B illustrates another exemplary workflow process of the computer assisted and manual document correction phase in accordance with an embodiment of the present invention.

FIG. 5B illustrates an open loop process with a reprocessing exception. The process in FIG. 5B is similar to the process of FIG. 5A. As one difference, the unacceptable bucket (i.e., Output: Unacceptable Articles) outputs or links back to the input. In other words, documents that have exceptions in one of the phases are resubmitted back to phase 1 of the loop process. This process of resubmitting articles with errors into the loop process can be repeated a predetermined finite number of times (example, n times, where n is an integer) or repeated until no documents are left in the unacceptable bucket.

Figure 5C:
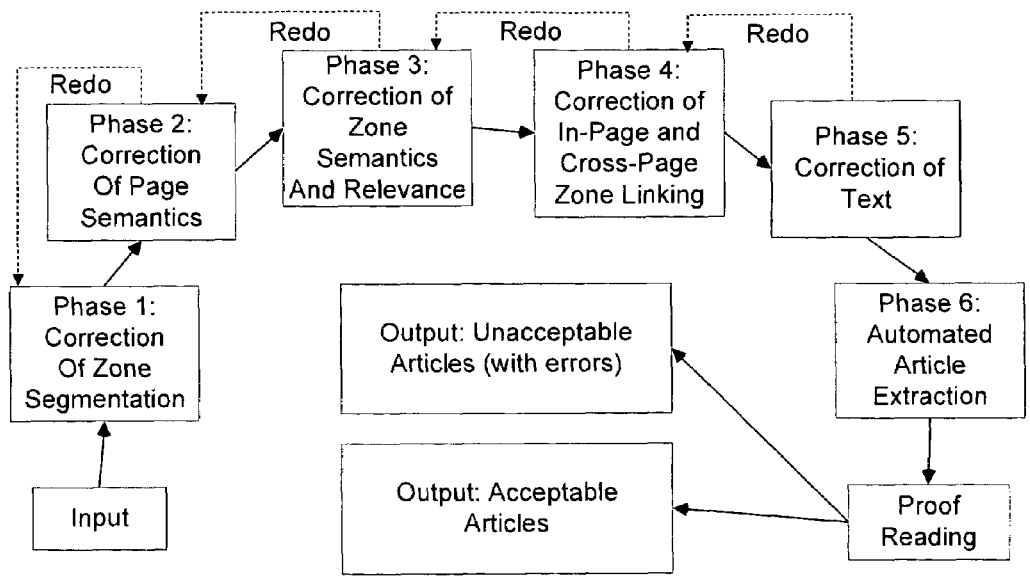
FIG. 5C illustrates another exemplary workflow process of the computer assisted and manual document correction phase in accordance with an embodiment of the present invention.

FIG. 5C illustrates a closed loop process with correction at various phases. In this process, each phase is utilized as a quality assurance or checkpoint for the output from the previous phase. If the input is acceptable, the task of that phase is performed and the output is passed to the next phase. If the input is not acceptable, then the input is returned (shown as "redo") back to the previous phase to be re-processed through that phase. For example, in Phase 2 (Correction of Page Semantics), the input is checked to see if the zones are correct according to Phase 1 (Correction of Zone Segmentation). If the zones are not correct, then the input is sent back again to Phase 1.

In one exemplary embodiment, a check or verification step is independently performed at each phase. For example, a "check" task is added to the output of each of the phases with the following rule: acceptable means proceed to the next phase, and unacceptable means proceed to feedback to the previous phase.

Figure 5D:
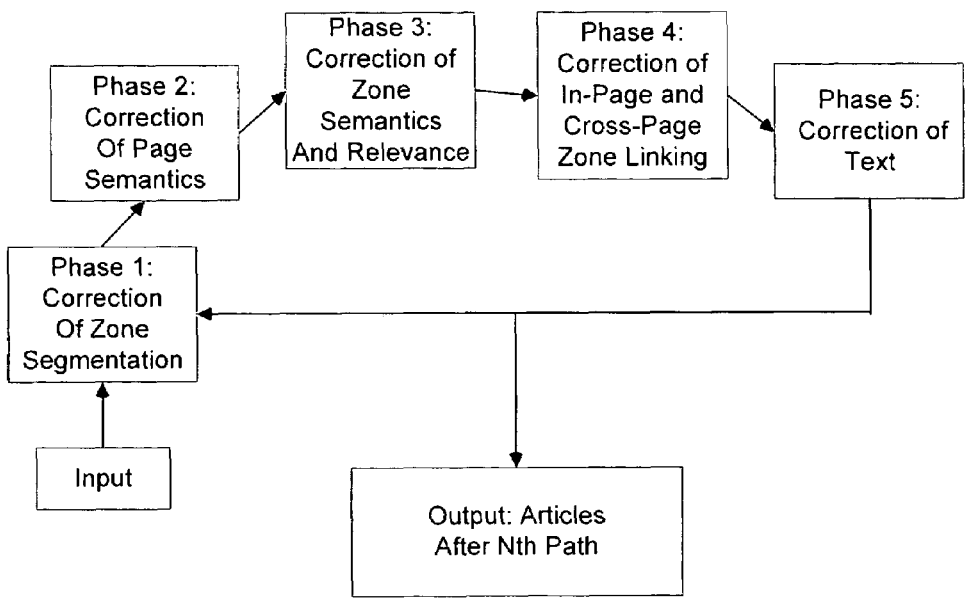
FIG. 5D illustrates another exemplary workflow process of the computer assisted and manual document correction phase in accordance with an embodiment of the present invention.

FIG. 5D illustrates a closed loop process generating output after a designated number of iterations or passes. In this process, the manual or user proof reading activity is excluded. Instead, the process utilizes multiple paths to check or verify that articles and documents are accurate and/or meet an error threshold. For example, the process includes multiple paths of the same open loop process. The output from the last phase (phase 5: Correction of Text) is then fed back to the input of the process (Phase 1: Correction of Zone Segmentation).

The feedback cycle of the process is repeated a predetermined number of times. For example, consider the paths n and n+1. If no corrections are made on path n+1 (using the output from path n as the input), then the output is considered the final output and passed to the acceptable bucket (i.e., Output: Articles After Nth Path). As an alternative, differences (example, percent of change in accuracy) between path n and path n+1 are measured after each complete pass through the loop. If the difference is small (example, below a threshold), then no further passes through the loop are required. As yet another alternative, each path can be sent to a different operator or user. For example, path n is reviewed with a first operator, and path n+1 is reviewed with a second operator, different than the first operator.

Embodiments in accordance with the invention enable a user to visually verify correctness of output from automated processes directed to reconstructing articles and documents. One exemplary embodiment processes paper-based documents (example, scanned magazines, books, etc.) and converts such documents into electronic searchable digital repositories. Further, one exemplary embodiment includes a software application or software tool that uses visual indicia (such as color, lines, arrows, boxes, etc.) to assist a user in visually assessing correctness of the output from the automated document processing phase 220 of FIG. 2.

In one exemplary embodiment, the flow diagrams can be automated, manual, and/or a combination of automated and manual. As used herein, the terms "automated" or "automatically" (and like variations thereof) mean controlled operation of an apparatus, system, and/or process using computers and/or mechanical/electrical devices without the necessity of human intervention, observation, effort and/or decision. The term "manual" means the operation of an apparatus, system, and/or process (even if using computers and/or mechanical/electrical devices) has some human intervention, observation, effort and/or decision.

The flow diagrams in accordance with exemplary embodiments of the present invention are provided as examples and should not be construed to limit other embodiments within the scope of the invention. For instance, the blocks or phases should not be construed as steps that must proceed in a particular order. Additional blocks/phases can be added, some blocks/phases removed, or the order of the blocks/phases altered and still be within the scope of the invention. Further, the article correction phases and the text correction phases are illustrated as part of the same process. In other embodiments, the article correction phases and the text correction phases are different and/or separate processes.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software (whether on the host computer system of FIG. 1, a client computer, or elsewhere) will differ for the various alternative embodiments. The software programming code, for example, is accessed by a processor or processors of the computer or server from long-term storage media of some type, such as a CD-ROM drive or hard drive. The software programming code is embodied or stored on any of a variety of known media (such as computer-readable medium) for use with a data processing system or in any memory device such as semiconductor, magnetic and optical devices, including a disk, hard drive, CD-ROM, ROM, flash memory, etc. The code is distributed on such media, or is distributed to users from the memory or storage of one computer system over a network of some type to other computer systems for use by users of such other systems. Alternatively, the programming code is embodied in the memory, and accessed by the processor using the bus. The techniques and methods for embodying software programming code in memory, on physical media, and/or distributing software code via networks are well known and will not be further discussed herein. Further, various calculations or determinations (such as those discussed in connection with the figures are displayed, for example, on a display) for viewing by a user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for document modification, comprising: using a processor to perform the steps of:
   automatically extracting articles in a first phase from documents to generate different zones of article regions in the articles;
   displaying the different zones of the extracted articles;
   displaying the different zones with different colors to visually distinguish between zones related to each other and zones not related to each other so a user can visually determine a correct reading order in the extracted articles; and
   manually modifying, with a document correction tool, a plurality of the different zones in a second phase to reduce a number of errors that occurred in the first phase.

2. The method of claim 1 further comprising:
   receiving input from a user;
   based on the input, adding and removing zones that identify text and image regions to reduce the number of errors that occurred in the first phase.

3. The method of claim 1 further comprising:
   displaying a page of an extracted article;
   manually changing, with the document correction tool, a label of the page to one of advertisement or article to reduce the number of errors that occurred in the first phase.

4. The method of claim 1 further comprising, manually changing, with the document correction tool, a designation of zone semantics of at least one of the different zones to reduce the number of errors that occurred in the first phase.

5. The method of claim 4, wherein the designation of zone semantics is selected from the group consisting of author, title, body of text, page number, and footnote.

6. The method of claim 1, wherein zones belonging to a same article have a same color.

7. The method of claim 1 further comprising, modifying, in the second phase, zone segmentation, page semantics, zone semantics, in-page zone linking, and cross-page zone linking.

8. The method of claim 1 further comprising:
   processing the documents through plural successive phases in the second phase;
   ceasing to modify a document in the second phase if one of the plural successive phases fails to cure an error.

9. A method for document modification, comprising: using a processor to perform the steps of:
   generating a plurality of separate document regions of articles in scanned documents that are input to an automated document processing phase;
   displaying the separate document regions with different colors to visually distinguish zones related to each other and zones not related to each other so a user can visually determine flow of the zones related to each other from one page to another page; and
   modifying, in response to input from a user, linkings between at least two of the document regions.

10. The method of claim 9 further comprising, changing a label of at least one text region to correct one of the errors, the label specifying relevance between the at least one text region and a page of an article in which the at least one text region occurs.

11. The method of claim 9 further comprising, correcting, in response to input from the user, a flow of the separate text regions to correct one of the errors, the flow providing a reading order of text regions in one of the articles.

12. The method of claim 9 further comprising, displaying arrows between the document regions to signify that the document regions belong to a same article.

13. The method of claim 9 further comprising:
   simultaneously displaying side-by-side two pages of one of the articles;
   correcting, in response to input from the user, plural linkings between document regions in the one of the articles to correct one of the errors.

14. The method of claim 9 further comprising, changing, in response to input from the user, reading order between plural document regions in separate pages of at least one article to properly reconstruct the at least one article.

15. The method of claim 9 further comprising, reassigning one text region from a first article to a second article in order to correct one of the errors and accurately reconstruct the second article.

16. The method of claim 9 further comprising:
correcting the linkings between plural document regions in plural different phases of a document correction tool;
outputting documents as being acceptable after passing the documents through the plural different phases n times, where n is an integer greater than one.

17. A computer system, comprising:
means for extracting, in a first phase, articles from documents to generate different zones of article regions in the articles;
means for manually modifying, with assistance of a software tool, how zones are divided to correct errors generated in the first phase;
means for manually modifying, with assistance of the software tool, how pages from articles are labeled to correct errors generated in the first phase;
means for displaying the different zones in the articles with different colors to visually distinguish zones related to each other and zones not related to each other so a user can visually determine flow of the zones related to each other from one page to another page:
means for manually modifying, with assistance of the software tool, how zones are labeled to correct errors generated in the first phase; and
means for manually modifying, with assistance of the software tool, how zones are linked together to correct errors generated in the first phase.

18. The computer system of claim 17 further comprising, means for correcting, with assistance of the software tool, how pages from articles are linked together to correct errors generated in the first phase.

19. A method for document modification, comprising: a computer code embodied on computer-readable medium and executable on a computer system, the computer code comprising:
code to extract articles from scanned documents to generate different zones in the articles during an automated document processing phase;
code to receive the different zones in the articles in order to correct errors generated during the automated document processing phase;
code to correct, in response to user input, how zones are divided;
code to correct, in response to user input, how pages from articles are labeled;
code to display the different zones in the articles with different colors to visually distinguish between zones related to each other and zones not related to each other so a user can visually determine a correct reading order in the extracted articles;
code to correct, in response to user input, how zones are labeled; and
code to correct, in response to user input, how zones are linked together.

20. The computer code of claim 19 further comprising, code to correct how pages from articles are linked together.

21. A computer readable medium having instructions for causing a computer to execute a method, comprising:
instructions for extracting articles in a first phase from documents to generate different zones in the articles;
instructions for displaying the different zones of the extracted articles;
instructions for displaying the different zones with different colors to visually distinguish between zones related to each other and zones not related to each other so a user can visually determine a correct reading order in the extracted articles; and
instructions for manually modifying, with a document correction tool, a plurality of the different zones in a second phase to reduce a number of errors that occurred in the first phase.

22. The computer readable medium of claim 21 further comprising:
instructions for receiving input from a user;
instructions for adding and removing zones that identify text and image regions to reduce the number of errors that occurred in the first phase.

23. The computer readable medium of claim 21 further comprising:
instructions for manually changing, with the document correction tool, a designation of zone semantics of at least one of the different zones to reduce the number of errors that occurred in the first phase.

24. The computer readable medium of claim 21 further comprising:
instructions for modifying, in the second phase, zone segmentation, page semantics, zone semantics, in-page zone linking, and cross-page zone linking.

25. The computer readable medium of claim 21 further comprising:
instructions for correcting, in response to input from a user, a flow of separate text regions to correct one of the errors, the flow providing a reading order of the text regions in one of the articles.

26. The computer readable medium of claim 21 further comprising:
instructions for displaying arrows between zones to signify that the zones belong to a same article.

* * * * *

UNITED STATES PATENT AND TRADEMARK OFFICE
CERTIFICATE OF CORRECTION

PATENT NO. : 7,697,757 B2
APPLICATION NO. : 11/153820
DATED : April 13, 2010
INVENTOR(S) : Sherif Yacoub et al.

It is certified that error appears in the above-identified patent and that said Letters Patent is hereby corrected as shown below:

In column 11, line 27, in Claim 17, delete "page:" and insert -- page; --, therefor.

Signed and Sealed this

Twenty-ninth Day of June, 2010

David J. Kappos
*Director of the United States Patent and Trademark Office*